United States Patent [19]

Watanabe

[11] 4,372,701
[45] Feb. 8, 1983

[54] FIXING STRUCTURE

[75] Inventor: Takeshi Watanabe, Tokyo, Japan

[73] Assignee: Nissan Motor Company, Limited, Kanagawa, Japan

[21] Appl. No.: 172,264

[22] Filed: Jul. 25, 1980

[30] Foreign Application Priority Data

Jul. 26, 1979 [JP] Japan .......................... 54-103921[U]

[51] Int. Cl.³ .............................................. F16B 35/04
[52] U.S. Cl. ..................................... 403/24; 403/408; 411/119
[58] Field of Search .......................... 403/408, 24, 25; 411/119, 116, 156, 155

[56] References Cited

U.S. PATENT DOCUMENTS

| | | | |
|---|---|---|---|
| 3,176,808 | 4/1965 | Matthews | 403/408 |
| 3,231,288 | 1/1966 | Hensien. | |
| 3,523,395 | 8/1970 | Rutter et al. | 403/408 X |

FOREIGN PATENT DOCUMENTS

| | | |
|---|---|---|
| 25536 | 1/1884 | Fed. Rep. of Germany ...... 411/116 |
| 1425946 | 3/1969 | Fed. Rep. of Germany . |
| 1654749 | 4/1971 | Fed. Rep. of Germany . |
| 8021054 | 10/1980 | Fed. Rep. of Germany . |
| 2045558 | 5/1971 | France . |
| 715086 | 9/1954 | United Kingdom . |
| 1031655 | 6/1966 | United Kingdom . |
| 1184522 | 3/1970 | United Kingdom . |
| 1207957 | 7/1970 | United Kingdom . |
| 1386078 | 5/1975 | United Kingdom . |
| 2002482 | 2/1979 | United Kingdom . |

Primary Examiner—Andrew V. Kundrat

[57] ABSTRACT

A bolt is adapted to pass through holes formed in a first and a second member. The bolt has a head adapted to be placed on the side of the first member, adjacent to the head a first stem portion of substantially circular cross section and slightly shorter than the thickness of the first member, adjacent to the first stem portion a second stem portion of a non-circular cross section smaller than that of the first stem portion, and in the vicinity of the end distal from the head a threaded portion adapted to receive a nut. The first member has therein a circular hole of substantially the same cross section as the first stem portion through which is passed the first stem portion. The second member has therein a hole of substantially the same size and shape as the second stem portion through which is passed the second stem portion. A nut is tightened so as to hold the first member between the head of the bolt and the second member, while the second member is held between a shoulder formed in the bolt between the first and second stem portions, and the nut, in such fashion that the bolt is unable to turn with respect to the second member.

6 Claims, 7 Drawing Figures

FIXING STRUCTURE

BACKGROUND OF THE INVENTION

1. Field of the Invention

The present invention relates to a structure for fixing a first and a second member together, and more particularly to a structure for fixing a first and a second member together between the head of a bolt and a nut threaded over an outer threaded end portion of the bolt.

2. Description of the Prior Art

Generally, in fixing a synthetic resin member such as a bumper to another member such as a support, a bolt and nut set has been used. The use of a bolt having a simple structure has often resulted in the bumper splitting or thermally deforming, thereby lowering the tightening of the bolt. Conventionally, in an attempt to overcome this problem, an ornamental bolt is inserted at a square stem portion thereof through holes in the bumper and a support through a sleeve, slightly shorter than the thickness of the bumper, positioned between the stem portion and the hole in the bumper. A washer is placed over the bolt, and then a nut is tightened over the threaded portion of the bolt, and the square stem portion of the bolt is engaged in the square hole in the support so as not to rotate in the square hole. The head of the bolt and the washer tightly hold the bumper and the support. In this case, excessive tightening force on the bolt and nut is received by the support through the sleeve and not applied directly to the bumper, thereby avoiding the above problem.

As another prior art fixing technique has been used an ornamental bolt which has a square stem inserted in complementary square holes in a bumper and a support. A spring washer is passed over the bolt, and then a nut is threaded over an outer threaded portion of the bolt and tightened against the bumper and the support. In this case, excessive tightening force on the bolt is borne by the washer, so that a constant tightening force only is applied to the bumper, thus solving the above problem. However, these structures require additional parts such as the sleeve and the washer thereby bringing about a relatively high cost of the structure as well as making the fixing relatively complicated.

It is an object of the present invention to provide a structure for fixing a first and a second member which prevents the loosening of a bolt without using any sleeve and special washer.

Another object of the present invention is to provide a structure for fixing a first and a second member which prevents a breakage in the first member, which may be for example a synthetic resin, and which brings about easy fixing of the first and second members.

SUMMARY OF THE INVENTION

The present invention provides a structure for fixing a first and a second member together comprising a bolt adapted to pass through holes formed in the first and second members. The bolt has a head adapted to be placed on the side of the first member, adjacent to the head a first stem portion of substantially circular cross section and slightly shorter than the thickness of the first member, adjacent to the first stem portion a second stem portion of a non-circular cross section smaller than that of the first stem portion, and in the vicinity of the end distal from the head a threaded portion adapted to receive a nut.

The first member has a portion in which is formed a circular hole of substantially the same cross section as the first stem portion through which is passed the first stem portion. The second member has a portion in which formed a hole of substantially the same size and shape as the second stem portion through which is passed the second stem portion. A nut is tightened so as to hold the first member between the head of the bolt and the second member, while the second member is held between a shoulder formed in the bolt between the first and second stem portions, and the nut, in such fashion that the bolt is unable to turn with respect to the second member.

Other objects, features and advantages of the present invention will be more fully understood from the following description of a preferred embodiment thereof, and from the appended drawings.

DETAILED DESCRIPTION OF THE PREFERRED EMBODIMENT

Figure 1:
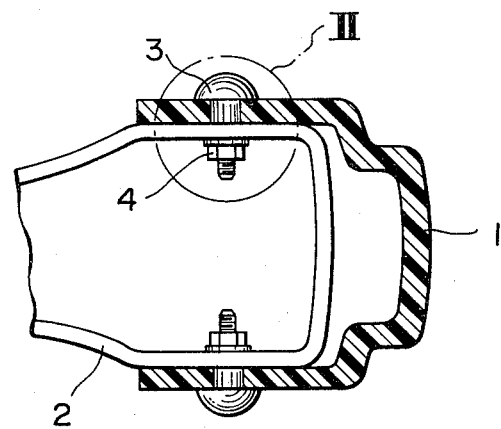
FIG. 1 is an illustration of a structure in which a synthetic resin member is fixed to a support member.

The same reference numerals are used to denote corresponding members throughout the drawings.

First, in order to facilitate understanding of the present invention, some prior art fixing structures will be described before proceeding to the description of the present invention.

Figure 2A:
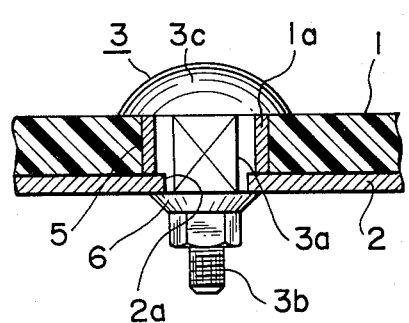
FIG. 2(a) is an enlarged view of the portion II circled in FIG. 1 and shows a prior art structure.
Figure 2B:
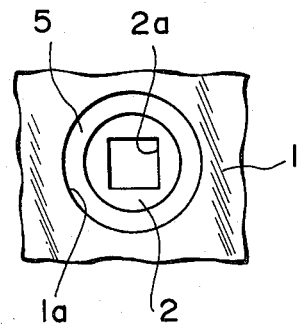
FIG. 2(b) is a plan view of the FIG. 2(a) prior art structure from which the bolt is removed for clarity.

In FIGS. 1, 2(a), and 2(b), a fixing structure uses a bumper made of a synthetic resin 1 and fixed to a support 2 by bolts 3 and nuts 4. In this case, the bolt 3 has a square stem portion 3a received in a corresponding relatively large circular hole 1a in the bumper 1 and a relatively small square hole 2a in the support 2. The square stem portion of the bolt 3a is substantially of the same shape and size as the hole 2a in the member 2. A sleeve 5 is disposed between the inner wall of the hole 1a and the stem portion 3a of the bolt 3, the sleeve 5 being slightly shorter than the depth of the hole 1a in the bumper 1. A washer 6 and a nut 4 are threaded over the threaded portion 3b of the bolt and the nut 4 is tightened against the support member 2. As clear from these figures, the bumper and the support are tightly held between the head of the bolt and the washer. In this case, excessive tightening force on the bolt is borne by the support 2 through the sleeve 5 thereby avoiding direct application of the tightening force to the bumper 1.

Figure 3A:
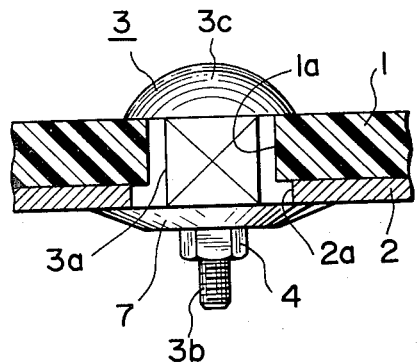
FIG. 3(a) is a view similar to FIG. 2(a) of another prior art structure.
Figure 3B:
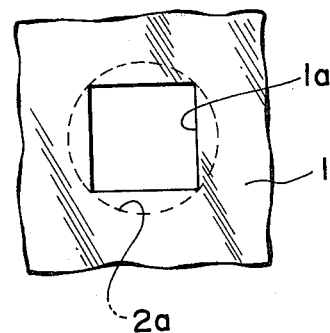
FIG. 3(b) is a view similar to FIG. 2(b) of the structure of FIG. 3(a)

In FIGS. 3(a) and 3(b), another prior art fixing structure uses an ornamental bolt 3 having a square stem portion 3a inserted in a substantially complementary hole 1a is the bumper 1 and a relatively large circular hole 2a in the support member 2. A special spring washer 7 in threaded over the bolt 3, and then a nut 4 is threaded over the outer threaded portion 3b of the bolt 3 and tightened against the support member 2, whereby the square stem portion $3a_1$ of the bolt 3 is engaged in the corresponding hole 1a in the bumper 1 and is prevented from rotating therein. Thus the bumper and the support are tightly held between the head of the bolt and the washer. In this case, excessive tightening force on the bolt 3 is borne by the spring washer 7 with the result that only a constant tightening force is applied to the bumper 1.

Figure 4A:
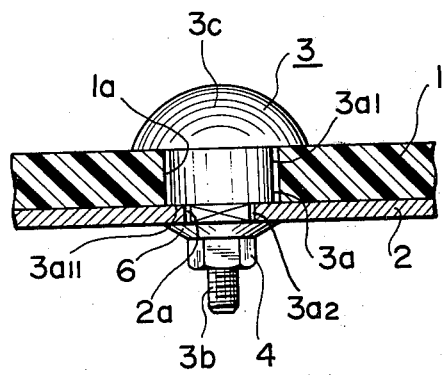
FIG. 4(a) is a view similar to FIG. 2(a) of a structure for fixing according to the present invention.
Figure 4B:
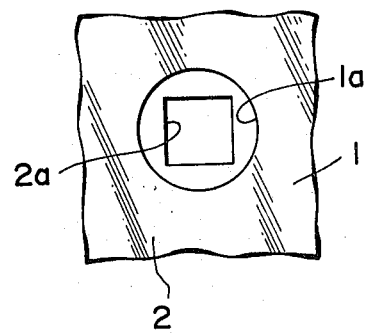
FIG. 4(b) is a view similar to FIG. 2(b) of the structure of FIG. 4(a).

In FIGS. 4(a) and 4(b), a fixing structure according to the present invention is shown. A bolt 3 has an intermediate stem part 3a which includes a first relatively large circular stem portion 3a freely passable through a corresponding circular hole 1a in the bumper 1 and slightly shorter than the hole 1a. The stem 3a of the bolt 3 further includes a second square stem portion $3a_2$ smaller in diameter than the first stem portion $3a_1$ and inserted in a square hole 2a in the support member 2, thereby preventing the bolt from rotation in the hole 2a. A conventional washer 6 and a nut 4 are threaded over the outer threaded end portion 3b of the bolt 3 and the nut 4 is tightened against the bumper 1. Thus the bumper 1 is held between the head 3c of the bolt 3 and the support 2 and the smaller stem portion $3a_2$ of the bolt 3 is engaged in the square hole 2a in the support 2. A shoulder $3a_{11}$ forming part of the end face of the first larger stem portion $3a_1$ of the bolt 3 and the washer 6 cooperate to hold the support 2 tightly with the aid of the nut 4. The tightening force on the bumper 1 can be selected to an appropriate value depending on the thickness of the bumper 1 and the length of the first stem portion of the bolt 3. In the particular embodiment, excessive tightening force on the bolt 3 is borne by the support 2 thereby preventing the force from being directly applied to the bumper.

Formation of the hole 1a in the bumper 1 as a slightly elongated slot serves to prevent longitudinal stress in the bumper due to thermal deformation.

There has been provided a fixing structure according to the present invention that satisfies all of the aims and objectives set forth hereinabove. However, it should be understood that further modifications and variations may be made in the present invention without departing from the spirit of the present invention as set forth in the appended claims.

What is claimed is:

1. A structure for fixing a bumper and a support member together, comprising:
    (a) a bolt having a head, a first stem portion of substantially circular cross section, a second stem portion of a non-circular cross-section smaller than that of the first stem portion, and a threaded portion, connected in this order;
    (b) a portion of the bumper in which is formed a slot through which is passed the first stem portion, thereby alleviating longitudinal stress in the bumper due to thermal deformation;
    (c) a portion of the support member in which is formed a hole of substantially the same size and shape as the second stem portion and through which the second stem portion is passed;
    (d) a nut screwed onto the threaded portion of the bolt so as to hold the bumper between the head of the bolt and the support member, and in a fashion that the bolt is unable to turn with respect to the support member; and
    (e) the support member being held between a shoulder formed in the bolt between the first and second stem portions and the nut.

2. The structure of claim 1 wherein the second stem portion is polygonal.

3. The structure of claim 2 wherein the second stem portion is square.

4. The structure of claim 2 or 3 further comprising a washer disposed between the nut and the support member.

5. The structure according to claim 2 or 3, wherein said bumper is made of a synthetic resin.

6. The structure according to claim 5, wherein said bolt is ornamental.

* * * * *